(12) United States Patent
Hosek et al.

(10) Patent No.: US 12,199,469 B2
(45) Date of Patent: Jan. 14, 2025

(54) MATERIAL WITH DIRECTIONAL MICROSTRUCTURE

(71) Applicant: Persimmon Technologies Corporation, Wakefield, MA (US)

(72) Inventors: Martin Hosek, Lowell, MA (US); Jayaraman Krishnasamy, Boxborough, MA (US)

(73) Assignee: Persimmon Technologies Corporation, Wakefield, MA (US)

( * ) Notice: Subject to any disclaimer, the term of this patent is extended or adjusted under 35 U.S.C. 154(b) by 548 days.

(21) Appl. No.: 16/847,853

(22) Filed: Apr. 14, 2020

(65) Prior Publication Data

US 2020/0244112 A1 Jul. 30, 2020

Related U.S. Application Data

(63) Continuation of application No. 15/484,486, filed on Apr. 11, 2017, now Pat. No. 10,622,848.

(Continued)

(51) Int. Cl.
| | |
|---|---|
| *C23C 4/08* | (2016.01) |
| *B22F 1/16* | (2022.01) |
| *H01F 1/33* | (2006.01) |
| *H01F 41/02* | (2006.01) |
| *H02K 1/02* | (2006.01) |

(Continued)

(52) U.S. Cl.
CPC ............ *H02K 1/02* (2013.01); *H01F 1/33* (2013.01); *H01F 41/0206* (2013.01); *H02K 1/146* (2013.01); *H02K 15/022* (2013.01); *B22F 1/068* (2022.01); *B22F 1/16* (2022.01); *B22F 3/115* (2013.01); *B22F 5/106* (2013.01);
(Continued)

(58) Field of Classification Search
CPC ........ H02K 1/02; H02K 1/146; H02K 15/022; H01F 1/33; H01F 41/0206; B22F 1/068; B22F 1/16; B22F 3/115; B22F 5/106; B22F 2998/10; B22F 2999/00; B22F 2298/10; B22F 2299/00; C22C 2202/02; C23C 4/08; C23C 4/11; C23C 4/123; C23C 4/129; C23C 4/131; C23C 28/023; C23C 28/027; C23C 30/00
USPC ................................................ 310/216.066
See application file for complete search history.

(56) References Cited

U.S. PATENT DOCUMENTS 5,238,507 A * 8/1993 Kugimiya ............... H01F 1/083
75/235
6,499,209 B1 * 12/2002 Landin ..................... H02K 1/04
29/596

(Continued)

FOREIGN PATENT DOCUMENTS

| CN | 1872657 A | 12/2006 |
|---|---|---|
| CN | 1874955 A | 12/2006 |

(Continued)

OTHER PUBLICATIONS

Machine translation of JP-2007129154-A. (Year: 2007).*

*Primary Examiner* — Michael Andrews
(74) *Attorney, Agent, or Firm* — Harrington & Smith

(57) ABSTRACT

A material comprises at least one layer of a plurality of domains, each domain being flattened in a first direction and elongated in a second direction normal to the first direction. The flattened and elongated domains define an anisotropic microstructure that facilitates a magnetic flux flow in the second direction.

9 Claims, 17 Drawing Sheets

Related U.S. Application Data

(60) Provisional application No. 62/320,723, filed on Apr. 11, 2016.

(51) Int. Cl.
 H02K 1/14 (2006.01)
 H02K 15/02 (2006.01)
 B22F 1/068 (2022.01)
 B22F 3/115 (2006.01)
 B22F 5/10 (2006.01)

(52) U.S. Cl.
 CPC ....... *B22F 2998/10* (2013.01); *B22F 2999/00* (2013.01); *C22C 2202/02* (2013.01)

(56) References Cited

U.S. PATENT DOCUMENTS

| | | | |
|---|---|---|---|
| 7,361,272 | B2 | 4/2008 | Kameda .................. 210/500 |
| 9,205,488 | B2 | 12/2015 | Hosek et al. |
| 10,622,848 | B2* | 4/2020 | Hosek ..................... H02K 1/02 |
| 2007/0241622 | A1 | 10/2007 | Toyoda et al. .................. 310/44 |
| 2013/0000860 | A1 | 1/2013 | Hosek et al. |
| 2013/0004359 | A1 | 1/2013 | Hosek ............................. 419/29 |
| 2015/0364235 | A1* | 12/2015 | Okamoto .................. H01F 1/24 335/297 |
| 2016/0043602 | A1 | 2/2016 | Hosek et al. |
| 2017/0294811 | A1* | 10/2017 | Hosek ..................... C23C 4/129 |
| 2020/0244112 | A1* | 7/2020 | Hosek ...................... H01F 1/33 |

FOREIGN PATENT DOCUMENTS

| | | | |
|---|---|---|---|
| CN | 101274737 | A | 10/2008 |
| CN | 103449351 | A | 12/2013 |
| CN | 103636101 | A | 3/2014 |
| CN | 104555883 | A | 4/2015 |
| JP | H-11238614 | A | 8/1999 |
| JP | 2002112513 | A | 4/2002 |
| JP | 2005184916 | A | 7/2005 |
| JP | 2007129154 | A * | 5/2007 |
| JP | 2009-212466 | A | 9/2009 |
| JP | 2011244673 | A | 12/2011 |
| JP | 2012253905 | A | 12/2012 |
| JP | 2014521209 | A | 8/2014 |
| JP | 2016516896 | A | 6/2016 |

* cited by examiner

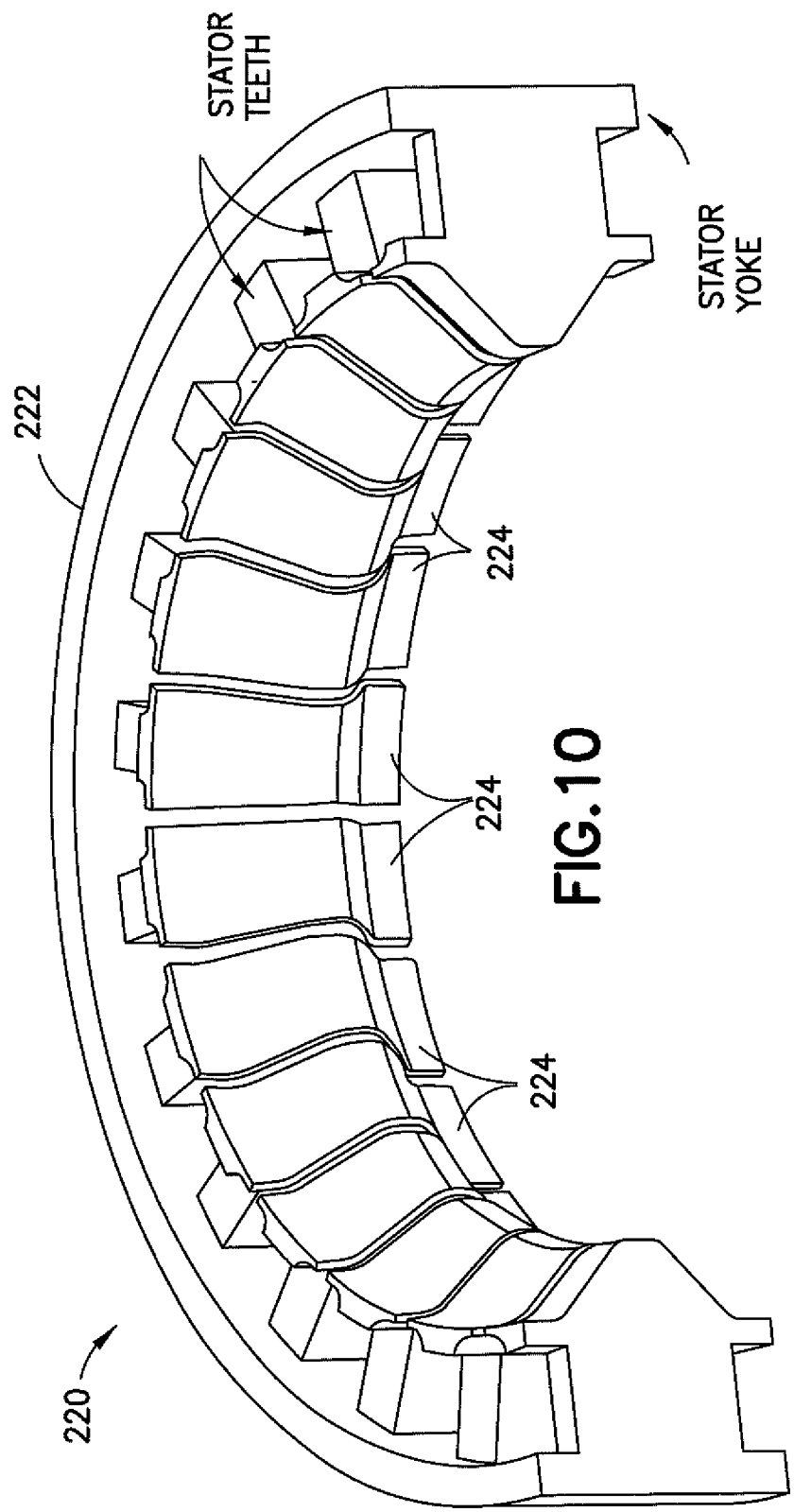

MATERIAL WITH DIRECTIONAL MICROSTRUCTURE

CROSS REFERENCE TO RELATED APPLICATION

This application is a continuation of U.S. Ser. No. 15/484,486, filed on Apr. 11, 2017, which claims priority under 35 USC 119(e) to U.S. provisional patent application No. 62/320,723, filed Apr. 11, 2016, both applications hereby incorporated by reference in their entireties.

BACKGROUND

Technical Field

The exemplary and non-limiting embodiments described herein relate generally to materials having directional microstructures with electrically insulated domains and structures incorporating such materials and, more particularly, to materials having direction- and location-dependent microstructures, which give such materials direction- and location-dependent physical properties. The exemplary and non-limiting embodiments described herein also particularly relate to methods for making such materials and devices that utilize such materials.

Brief Description of Prior Developments

U.S. Pat. No. 9,205,488 describes a soft magnetic material produced by a spray-forming process. U.S. Patent Publication No. 2013/0000860 describes a spray-forming process based on layered particle deposition.

SUMMARY

The following summary is merely intended to be exemplary. The summary is not intended to limit the scope of the claims.

In accordance with one aspect, a material comprises: at least one layer of a plurality of domains, each domain being flattened in a first direction and elongated in a second direction normal to the first direction. The flattened and elongated domains define an anisotropic microstructure that facilitates a magnetic flux flow in the second direction.

In accordance with another aspect, a stator core of a radial-field electric motor comprises: a yoke having a ring structure configured to rotate about an axis; and tooth structures extending radially inward from an inner-facing surface of the yoke. The yoke comprises a material defined by layers of a plurality of domains, the domain of each layer being flattened in a first direction and elongated in a second direction normal to the first direction. The flattened and elongated domains define an anisotropic microstructure that facilitates a magnetic flux flow in the second direction in the yoke.

In accordance with another aspect, a stator winding core of a hybrid-field electric motor comprises: a yoke having a ring structure; and a plurality of teeth on an inner-facing surface of the yoke. The yoke and the teeth each comprise a material defined by layers of a plurality of domains, the domain of each layer being flattened in a first direction and elongated in a second direction normal to the first direction. The flattened and elongated domains define an anisotropic microstructure that facilitates a magnetic flux flow in the second direction in one or more of the yoke and the teeth.

BRIEF DESCRIPTION OF THE DRAWINGS

The foregoing aspects and other features are explained in the following description, taken in connection with the accompanying drawings, wherein:

FIG. 10 is a section view of one example embodiment of a portion of a stator winding core of a hybrid-field electric motor with directional microstructure;

DETAILED DESCRIPTION OF EMBODIMENTS

U.S. Pat. No. 9,205,488, which is incorporated herein by reference in its entirety, describes a soft magnetic material produced by a spray-forming process. The microstructure of the material is characterized by tightly packed domains (grains) separated by electrically insulating boundaries. Applications for such a material include winding cores of electric machines, for example, electric motors, which utilize materials with suitable magnetic properties, such as high permeability, high saturation flux density, and high electrical resistivity to control eddy current losses.

The microstructure of the above material is substantially the same within the volume of the material, and the material may comprise substantially isotropic physical properties (i.e., the properties are close to identical in all directions). While this allows for production of spray-formed components and bulk spray-formed material for general use, many applications may benefit from anisotropic material with direction- and location-dependent properties engineered (optimized) for a particular application.

Figure 1:
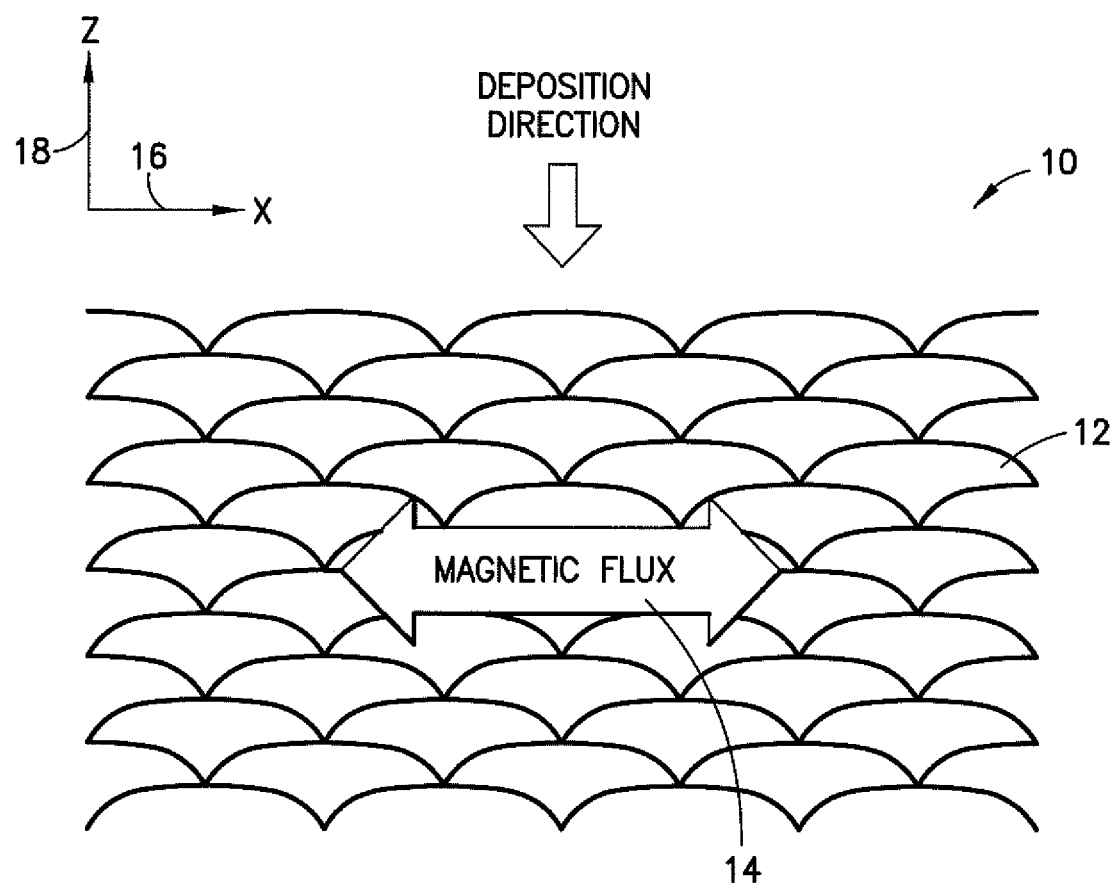
FIG. 1 is a schematic representation of one example embodiment of a material having a directional microstructure with electrically insulated domains.

Referring to FIG. 1, a diagrammatic depiction of one example embodiment of a material having a directional microstructure with electrically insulated domains is shown generally at 10 and is hereinafter referred to as "material 10." Although the features will be described with reference to the example embodiments shown in the drawings, it should be understood that features can be embodied in many alternate forms of embodiments. In addition, any suitable size, shape, or type of elements or materials could be used.

As shown, the material 10 may comprise an anisotropic microstructure with a directional bias. As illustrated in FIG. 1, the anisotropic microstructure may comprise domains 12 (grains) that may be shaped to facilitate a magnetic flux flow 14 in a preferred direction. Specifically, the domains 12 (grains) may be elongated along the preferred direction of magnetic flux flow (x-direction 16) and flattened in a direction normal to the preferred direction of magnetic flux flow (z-direction 18).

As a consequence of the above described anisotropic microstructure, the material 10 may exhibit directional magnetic properties. For example, permeability may be desirably increased in the preferred direction of magnetic flux flow (x-direction 16) while keeping electrical resistivity desirably high (or increasing the electrical resistivity) in the direction normal to the preferred direction of magnetic flux flow (z-direction 18).

Figure 2:
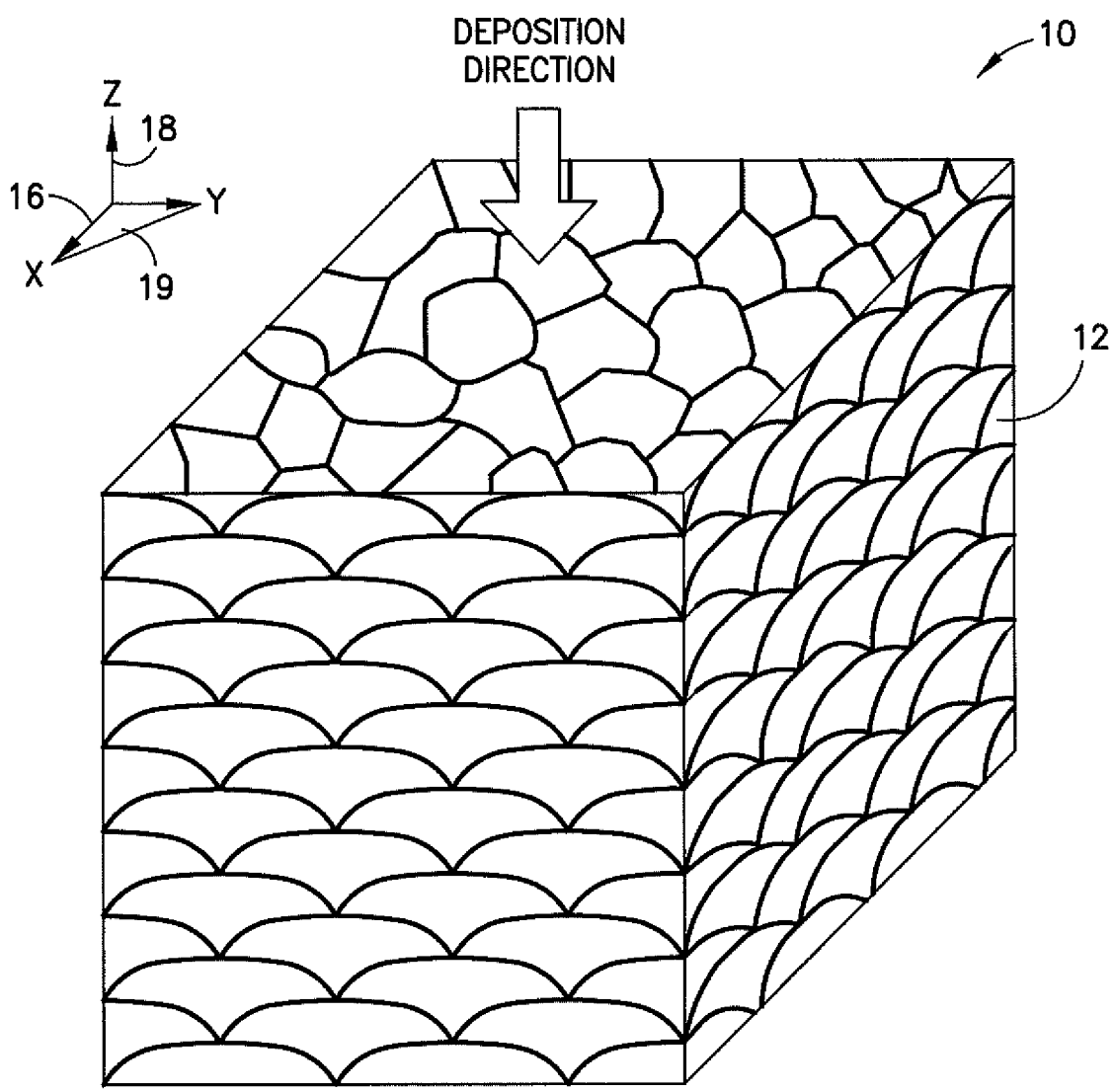
FIG. 2 is an isometric view of the material of FIG. 1.

Referring to FIG. 2, an isometric view of the material 10 shows the microstructure in three orthogonal planes. As shown in FIG. 2, the domains 12 (grains) of the microstructure may be shaped to facilitate magnetic flux flow in a preferred plane shown as xy-plane 19. Specifically, the domains 12 (grains) are enlarged in the preferred plane of magnetic flux flow (xy-plane 19) and flattened in the direction normal to the preferred plane of magnetic flux flow (z-direction 18).

Figure 3A:
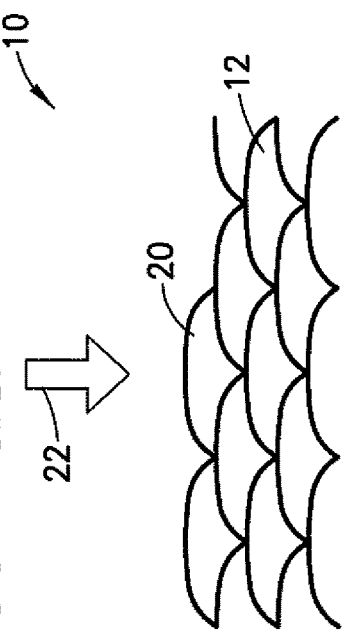
FIGS. 3A-3C are schematic representations of one example embodiment of a process of forming the material of FIG. 1.
Figure 3B:
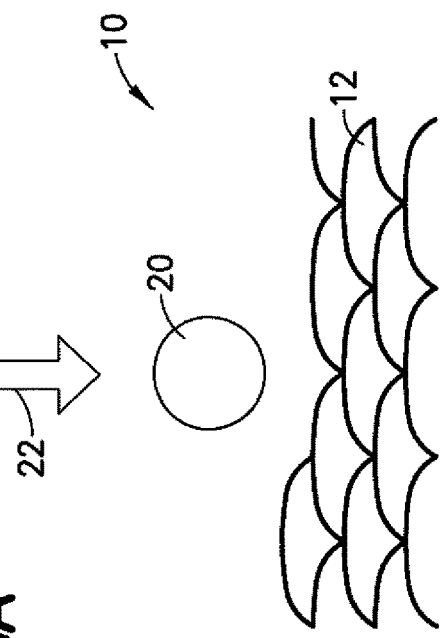
Figure 3C:
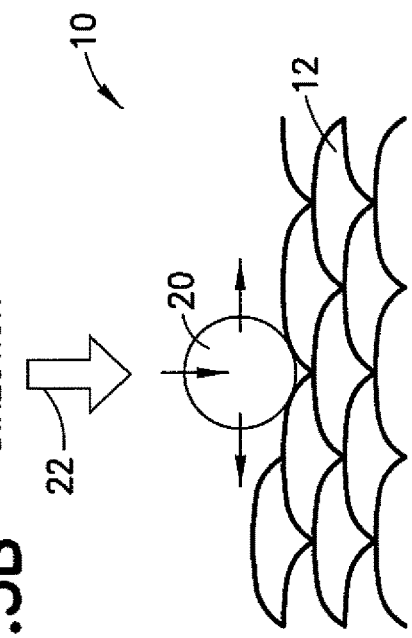

Referring now to FIGS. 3A-3C, the directional microstructure of the material 10 of FIGS. 1 and 2 may be produced, for example, by a spray-forming process. The parameters of the spray-forming process, such as the speed and temperature of the particles subject to deposition, may be set to achieve a desired degree of splatting, i.e., flattening deformation of an individual particle 20 upon landing. In particular, the dimension of the particle 20 along the direction of the deposition may be reduced, and the size of the particle 20 in the plane normal to the direction of deposition may grow, thus creating the above-described shapes of the domains 12 (grains) in the microstructure of the material 10. In FIG. 3A, the particle 20 is shown being deposited in a deposition direction 22 where the desired shape is obtained upon deposition and where the particle 20 moves at a velocity in the deposition direction 22. In FIG. 3B, the particle contacts the material 10 previously deposited. In FIG. 3C, the particle 20 deforms to the desired shape upon deposition.

The spray-forming process may be based on an arc wire process, plasma process, high velocity oxygen fuel process, high velocity air fuel process, cold spray process, or any other suitable deposition process. Similarly, the electrically insulating boundaries between domains 12 (grains) may be produced using suitable techniques.

Various chemistries may be used in the spray-forming process. As an example, an iron alloy (e.g., an electrically conductive material) may be used in the core of the domains, and an oxide, such as aluminum oxide, may be formed to provide the electrically insulating boundaries between the domains. Formation of the aluminum oxide on the iron alloy may be carried out by spraying particles of the iron alloy with aluminum oxide during flight. Aluminum oxide may exhibit desirably low electrical conductivity for the suppression of eddy currents, and it may remain stable at elevated temperatures, a property sought after for winding-core applications. Other materials that may be used with the iron alloy or other core material include, but are not limited to, aluminum, cobalt, nickel, and silicon.

Figure 4A:
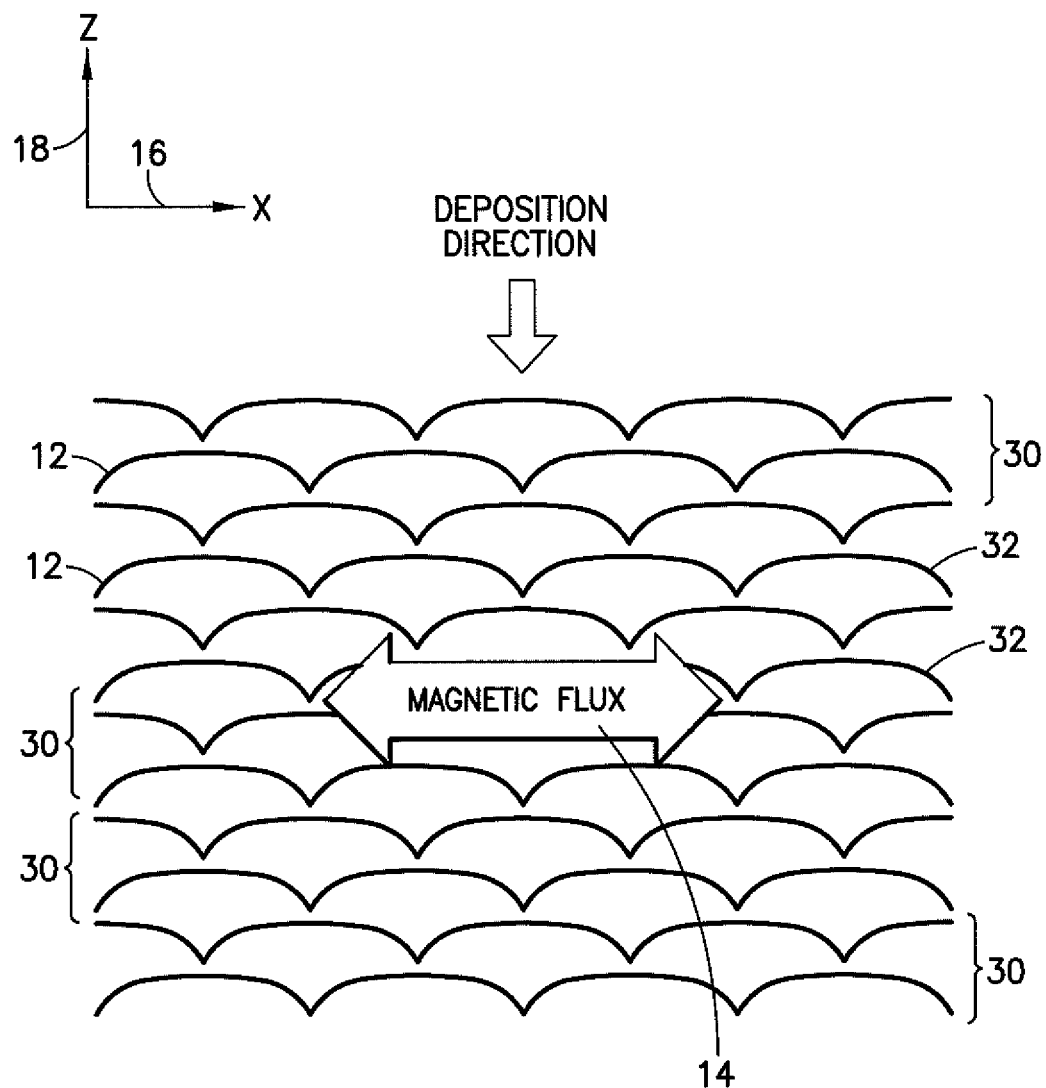
FIGS. 4A and 4B are schematic representations of one example embodiment of a material having a directional microstructure with electrically insulating layers.
Figure 4B:
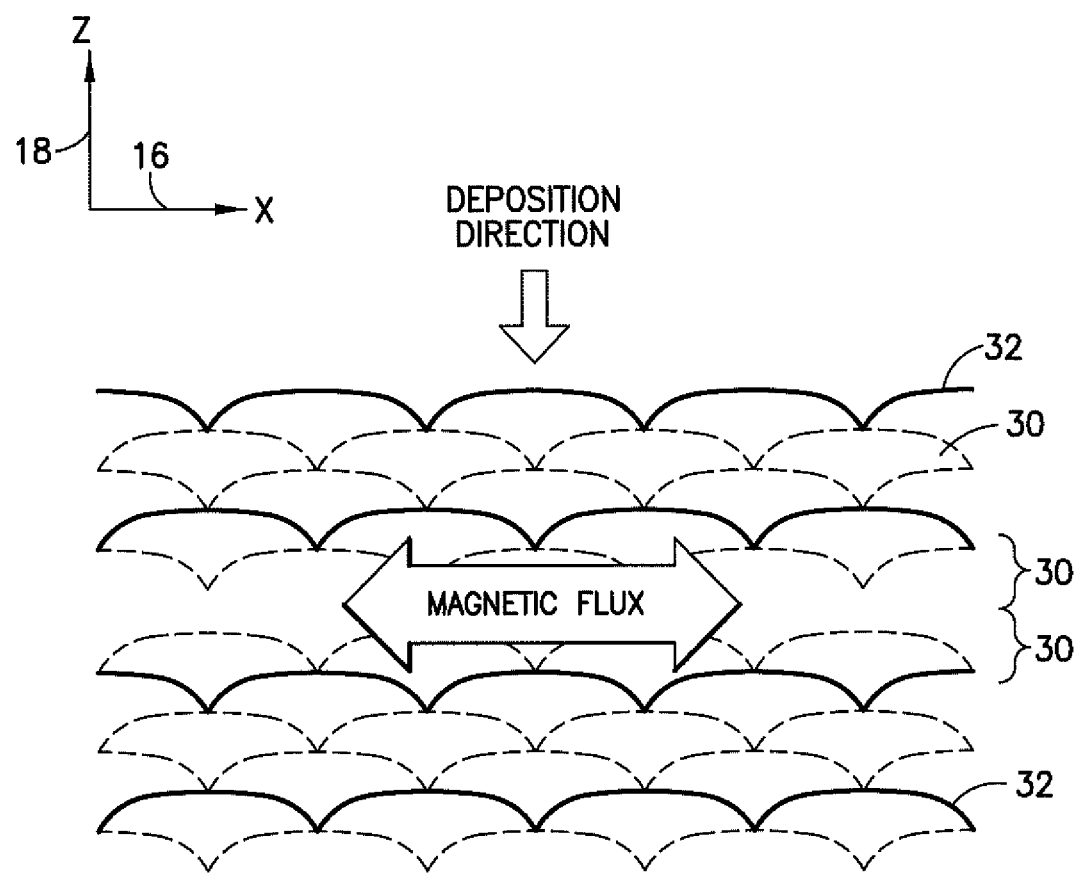

Referring now to FIGS. 4A and 4B, the directional bias (or anisotropy) of the material may be further enhanced by eliminating the electrically insulating boundaries in the preferred direction of magnetic flux (x-direction 16) to provide a directional microstructure with electrically insulating layers. The resulting microstructure comprises layers 30 of core material, which may be separated from each other by substantially continuous electrically insulating (nonconductive) boundaries 32.

In FIG. 4A, a microstructure is shown in which each layer 30 of core material is formed by a single layer of deposited particles (domains 12) and in which the deposited particles (domains 12) of a subsequently deposited layer partially overlap the deposited particles (domains 12) of the underlying layer 30. FIG. 4B depicts a microstructure where each layer 30 of core material is formed by multiple layers of deposited particles 20; in this case, the particles deposited within the same layer 30 of core material are not electrically insulated from each other. In some embodiments, eliminating the electrically insulating boundaries in the x-direction 16 and forming electrically insulating layers 30 may comprise deposition of iron alloy particles alternated with deposition of iron alloy particles having aluminum oxide coatings (or simply deposition of iron alloy particles alternated with deposition of aluminum oxide).

Figure 5:
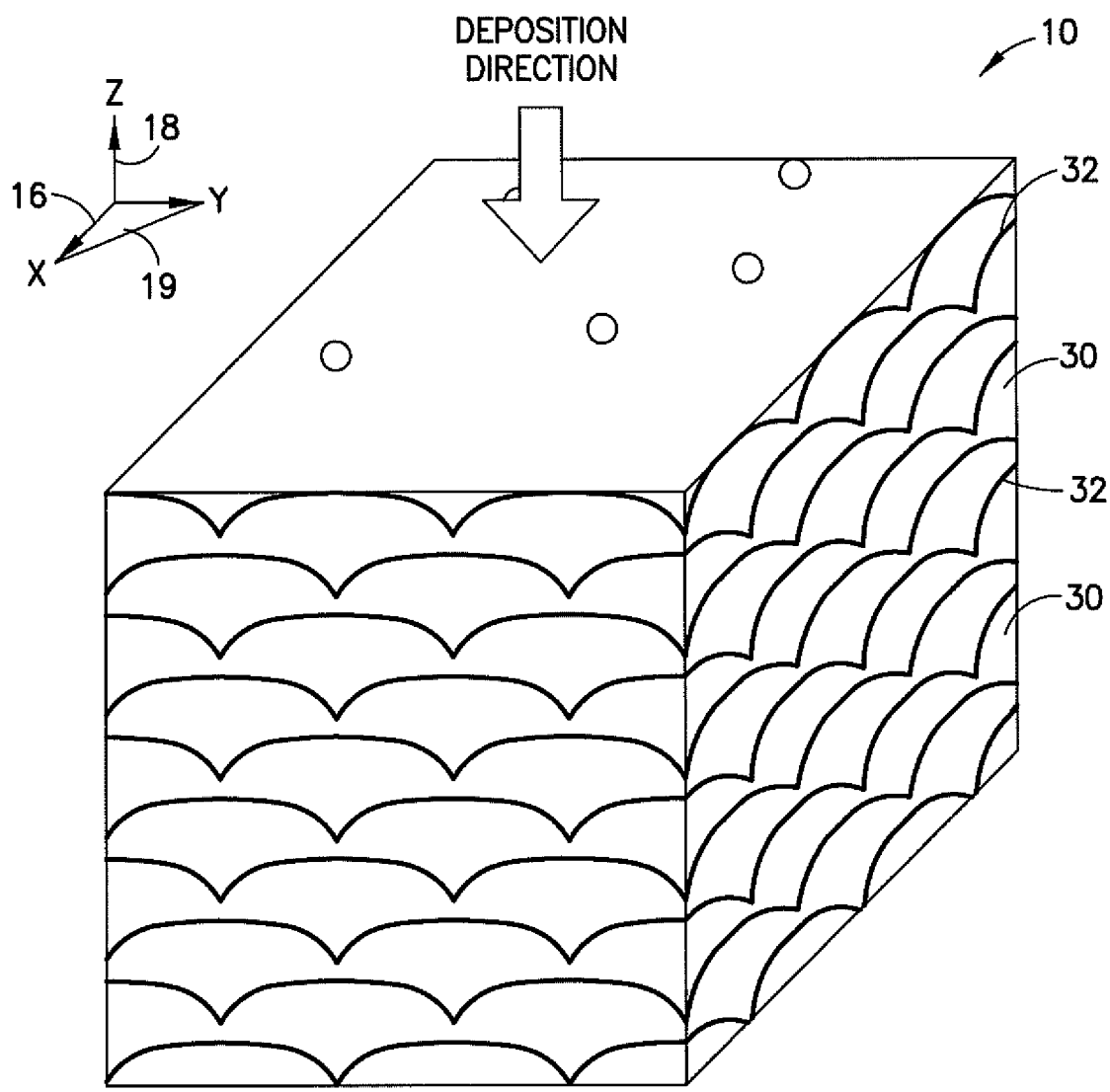
FIG. 5 is a schematic representation of an isometric view of the material of FIGS. 4A and 4B.

Referring now to FIG. 5, the microstructure of layers 30 is shown in three orthogonal planes. As shown, the electrically insulating boundaries 32 may be eliminated in the preferred planes of magnetic flux (substantially parallel with the xy-plane 19). Again, the resulting microstructure may comprise layers 30 of core material, which are separated from each other by substantially continuous electrically insulating (nonconductive) boundaries 32.

The microstructure of the example material of FIGS. 4A, 4B, and 5 may be produced, for example, by a spray-forming process based on layered particle deposition (U.S. Patent Publication No. 2013/0000860 incorporated herein by reference in its entirety). The parameters of the process may be selected to create layers of conductive material separated by substantially continuous electrically insulating boundaries 32.

The above examples of spray-formed anisotropic material may be conveniently extended beyond planar geometries. In general, the microstructure of the material may be designed to facilitate magnetic flux flow along a preferred non-planar surface, thus creating an equivalent of a three-dimensional laminate.

Furthermore, the microstructure of the material according to the present embodiment may feature patterns that reflect the desired paths of magnetic flux flow. Example non-planar geometries and patterns are described below.

Figure 6A:
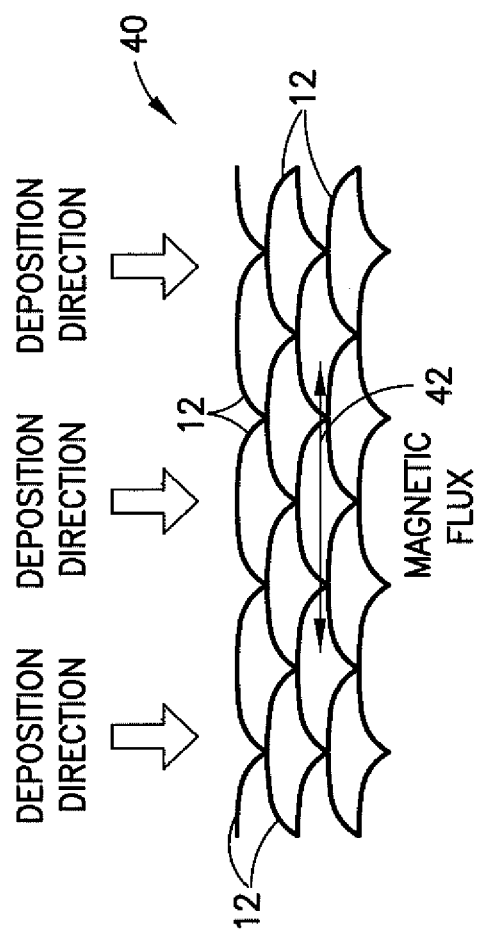
FIGS. 6A-6C are schematic representations of a material having a directional microstructure with direction- and location-dependent patterns.
Figure 6C:
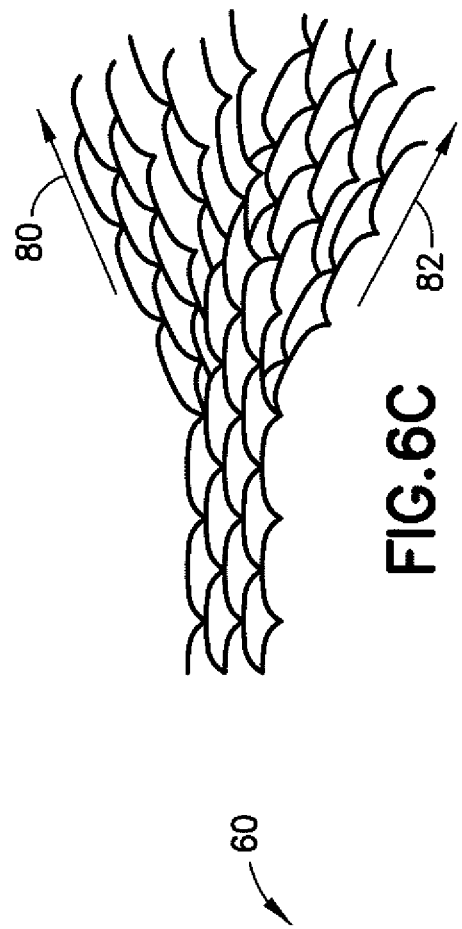
Figure 6B:
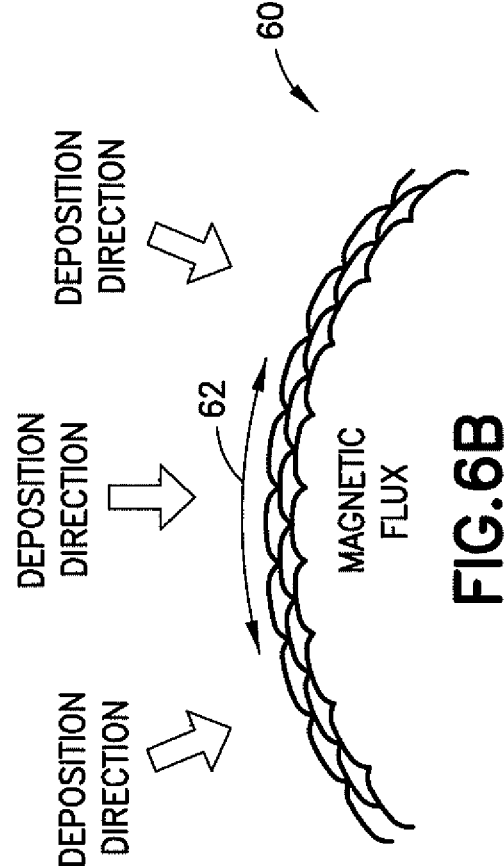

Referring now to FIGS. 6A-6C, the exemplary embodiments described herein may include direction- and location-dependent patterns. FIG. 6A illustrates one example of a pattern 40 of domains 12 that may be used for conducting flux in the direction shown by arrows 42. As another example, FIG. 6B shows a curved microstructure 60, which may be used for conducting magnetic flux in a circumferential direction 62. As yet another example, FIG. 6C illustrates a microstructure that may be used for a flux flow that is split to have a first portion 80 and a second portion 82. In any of the foregoing embodiments, the layers of the domains 12 may be curved to conduct magnetic flux in non-linear directions.

In all of the examples of FIGS. 6A-6C, permeability may be increased along the preferred surface of magnetic flux flow while maintaining or increasing electrical resistivity in the direction normal to the preferred surface of magnetic flux flow.

The example pattern of FIG. 6A may be produced, for example, by deposition (spray-forming) of material on a flat surface in a direction substantially normal to the surface, as illustrated in FIGS. 1, 4A, and 4B. Similarly, the example pattern of FIG. 6B may be formed, for example, by deposition (spray forming) of material on a cylindrical surface in a substantially radial direction.

Figure 7A:
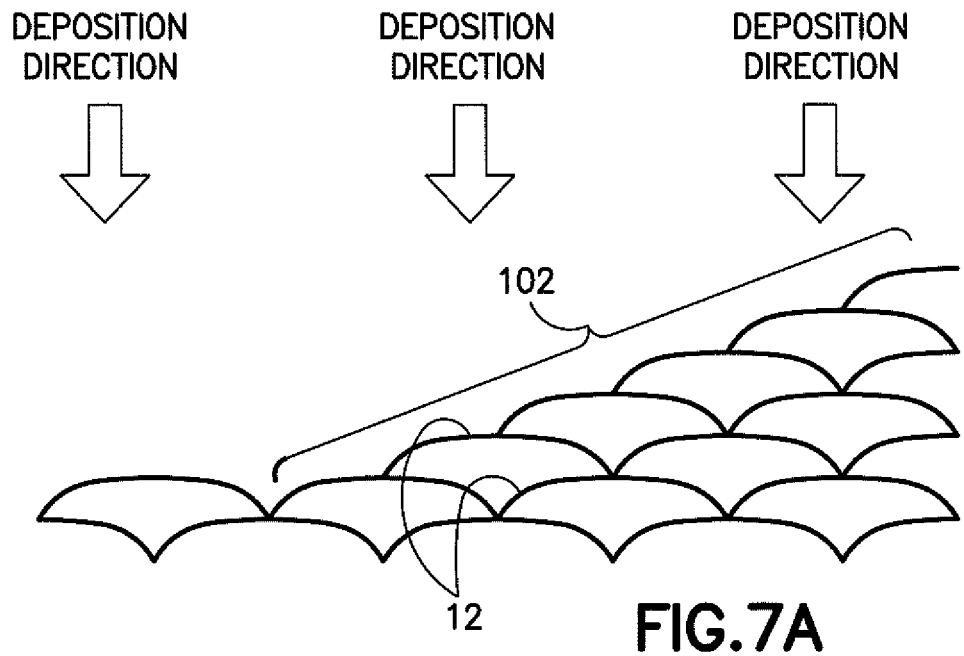
FIGS. 7A and 7B are schematic representations of one example embodiment of a process of forming the material of FIGS. 6A-6C.
Figure 7B:
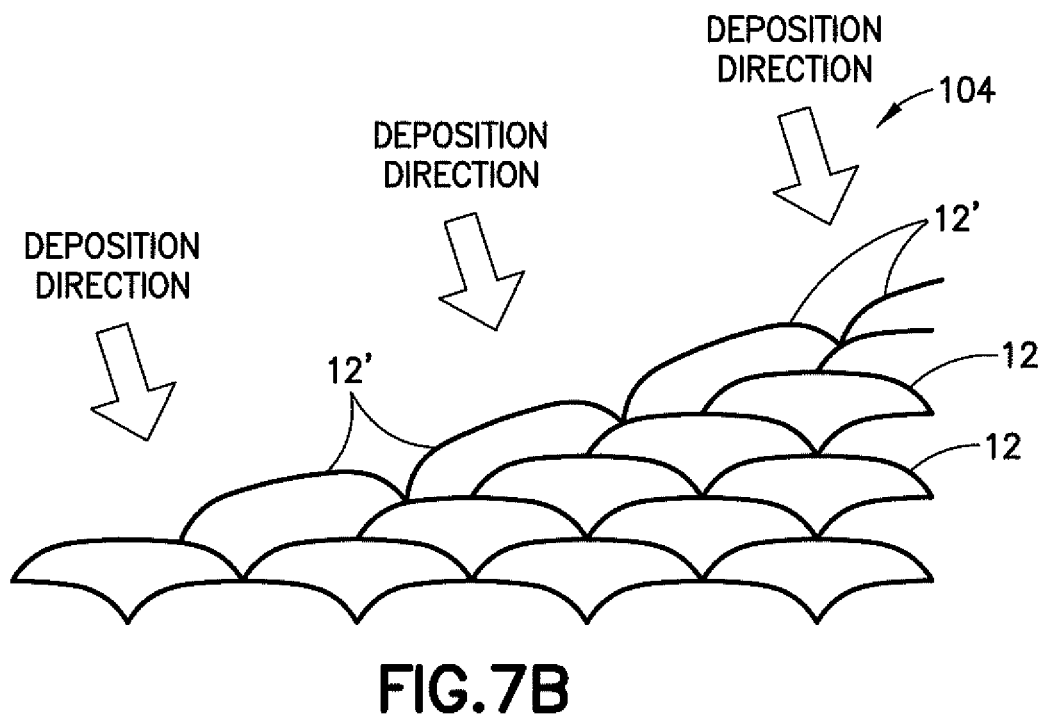

The example pattern of FIG. 6C may be produced, for example, by the process illustrated in FIGS. 7A and 7B. A gradually sloping surface 102 comprising domains 12 from flattened particles may be formed first, as shown in FIG. 7A. Additional material may then be deposited while varying (adjusting) the direction of deposition so that the additional material is deposited as domains 12' in a direction 104 that is substantially normal to the previously created surface, as illustrated in FIG. 7B, resulting in the desirable change in the orientation (direction) of the shape (flattening and elongation) of the domains 12 (grains) of the microstructure of the material. The steps of FIGS. 7A and 7B may be repeated to achieve further change in the orientation (direction) of the shape (flattening and elongation) of the domains 12 (grains) of the microstructure of the material.

The example directional microstructures shown in FIGS. 6A-6C may co-exist on the same spray-formed component, as illustrated in the examples below.

Figure 8A:
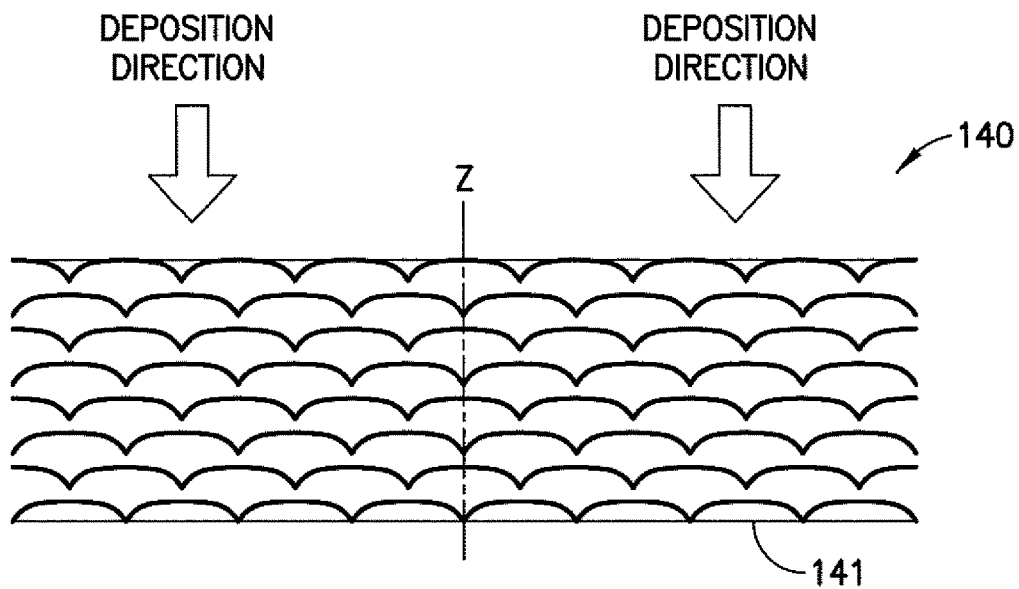
FIGS. 8A and 8B are schematic representations of one example embodiment of a stator core of a radial-field electric motor incorporating a material having directional microstructure.
Figure 8B:
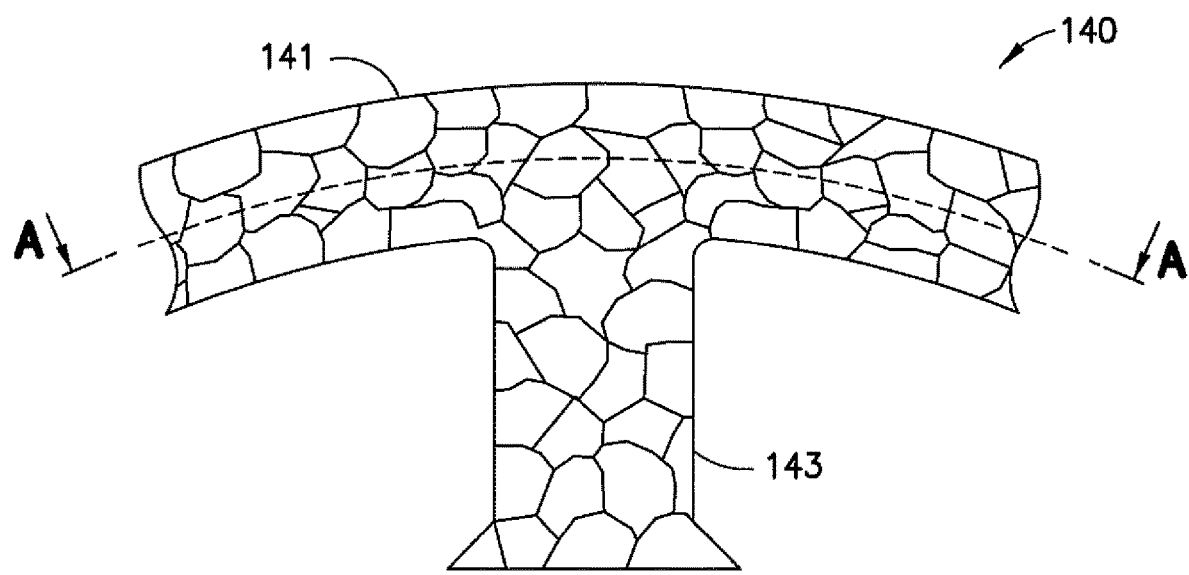

FIGS. 8A and 8B diagrammatically depict one example embodiment of a stator core 140 of a radial-field electric motor, the stator core 140 comprising a yoke 141 configured as a ring-type structure and at least one tooth 143 depending from an inner-facing surface of the ring structure. The stator core 140 further comprises a material with a directional microstructure. As shown in FIG. 8A, the axis of rotation of the motor is shown as axis z.

FIG. 8B also illustrates the microstructure of the material in a section of the stator core 140 when the motor is viewed axially (i.e., along the axis of rotation of the motor, axis z). FIG. 8A illustrates the microstructure of the stator core 140 when the motor is viewed radially (i.e., the microstructure seen on a cylindrical surface that sections the circumferential volume, also referred to as the yoke 141 of the stator core 140).

The microstructure of the example stator core 140 of FIGS. 8A and 8B facilitates magnetic flux flow in planes normal to the axis of rotation of the motor, and may be viewed as a solid equivalent of a laminated stator core used in electric motors.

The example stator core 140 of FIGS. 8A and 8B may be produced, for example, by building up the material of the stator core axially, i.e., by material deposition (spray-forming) in a direction parallel with the axis of rotation of the motor.

Figure 9A:
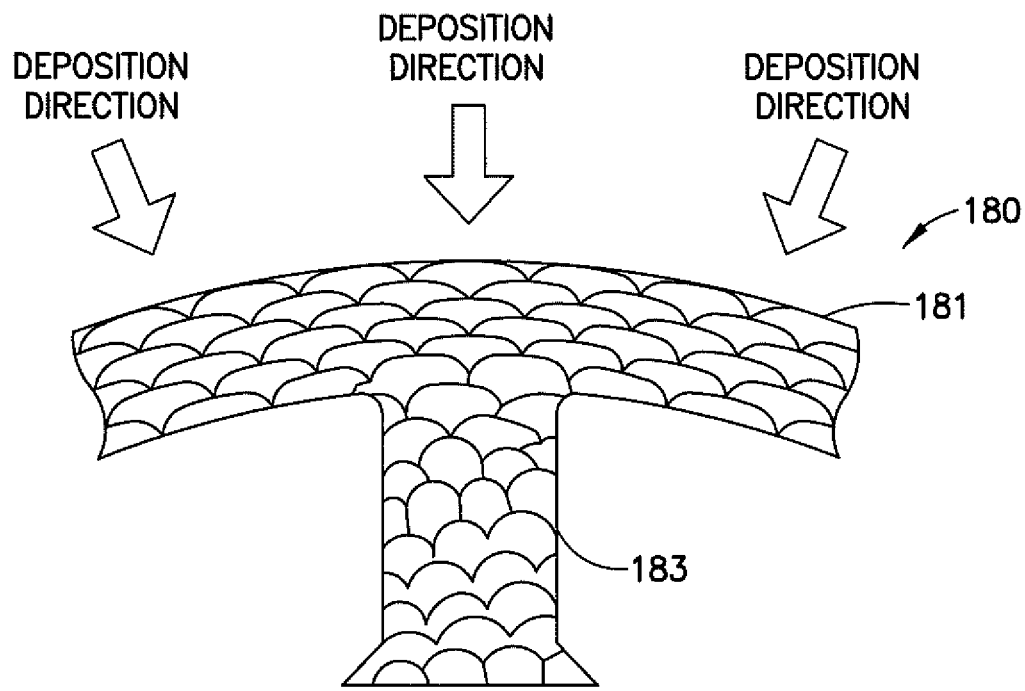
FIGS. 9A and 9B are schematic representations of example embodiments of stator cores of radial-field electric motors with direction- and location-dependent microstructures.
Figure 9B:
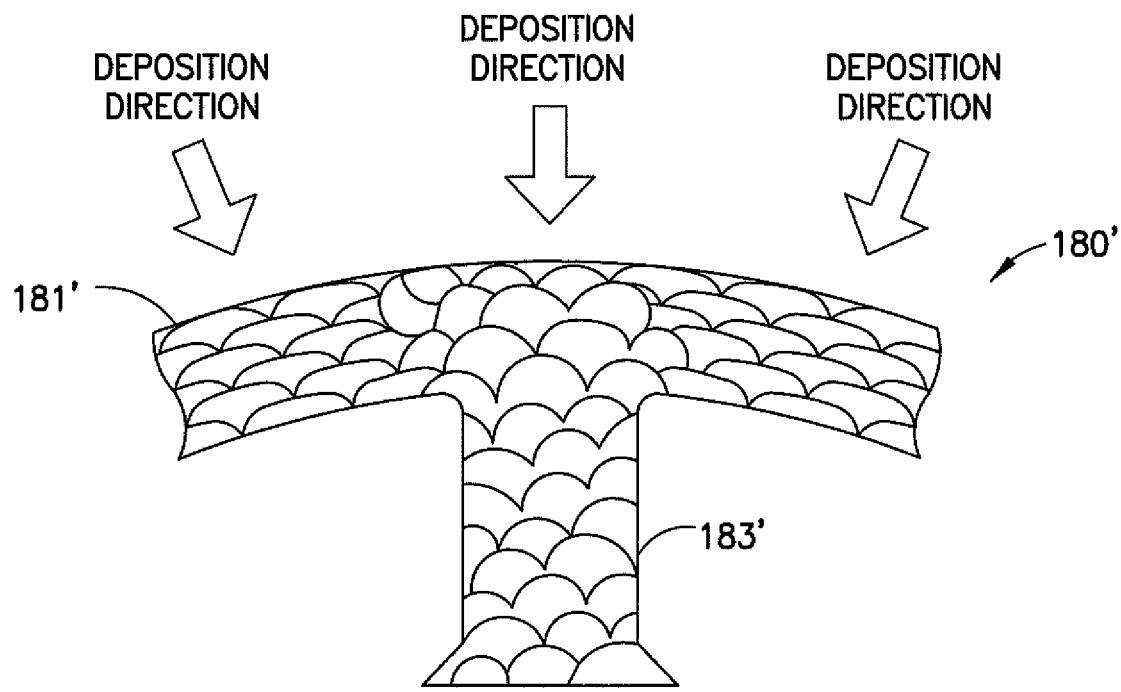

FIGS. 9A and 9B diagrammatically depict other examples of a stator core 180, 180' of a radial-field electric motor incorporating a material with direction- and location-dependent microstructure. As illustrated in FIGS. 9A and 9B, the microstructure in the circumferential volume of the stator core 180, 180' (the yoke 181, 181') may be configured to facilitate circumferential magnetic flux flow in the yoke 181, 181', and the microstructure in the teeth 183, 183' of the stator core may be isotropic to accommodate variations in the direction of the magnetic flux flow as the rotor of the motor rotates. The stator cores 180, 180' as shown in FIGS. 9A and 9B differ in the location of the transition boundary between the yoke and tooth microstructures.

The example stator cores 180, 180' of FIGS. 9A and 9B may be produced, for example, by building up the material of the stator core radially, i.e., by rotating the direction of material deposition (spray-forming) around the stator core or, more conveniently, by rotating the stator core while depositing the material radially in a fixed location. In the deposition (spray-forming) process, the parameters of the process may be varied (adjusted) to achieve the desired shape of the domains 12 (grains), as described herein.

For example, in order to produce the direction- and location-dependent microstructure as shown in FIG. 9A, the stator core 180 may rotate, the material may be deposited radially in a fixed location, and two sets of process parameters may be used. First, when the inner portion of the stator core 180, which corresponds to the teeth 183, is being formed, the process parameters may be set to produce a substantially isotropic microstructure. Then, when the outer portion of the stator core 180, which corresponds to the yoke 181, is being formed, the process parameters are set to produce the desired anisotropic microstructure. In this case, the process parameters may be switched as a function of the radial buildup of the deposited material.

As another example, in order to produce the direction- and location-dependent microstructure as shown in FIG. 9B, the process parameters may alternate between the above two sets multiple times as the stator core 180' rotates and the desired microstructure alternates between the isotropic and anisotropic configurations. In this case, the process parameters may be switched periodically as a function of the angular position of the stator core.

Referring now to FIG. 10, an example stator winding core 220 of a hybrid-field electric motor incorporating a material with directional microstructure is illustrated. As shown in FIG. 10, the stator winding core 220 may comprise a yoke 222 and a plurality of teeth 224. The yoke 222 may comprise a ring-structure with the teeth 224 located on an inner-facing surface of the ring structure such that a rotor (or other component) may be received in the ring-structure.

Figure 11A:
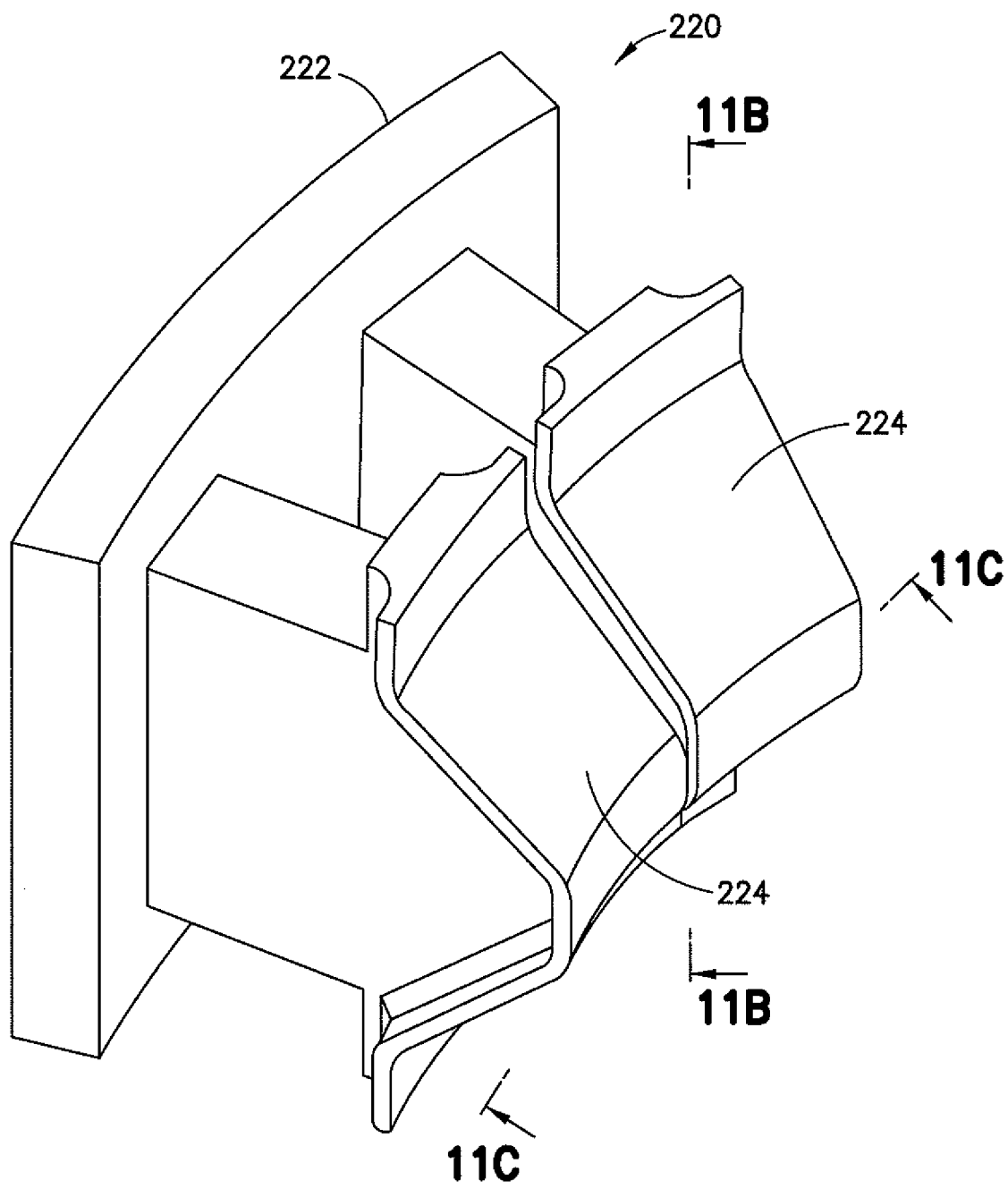
FIG. 11A illustrates a portion of the stator winding core of FIG. 10 showing two teeth.
Figure 11B:
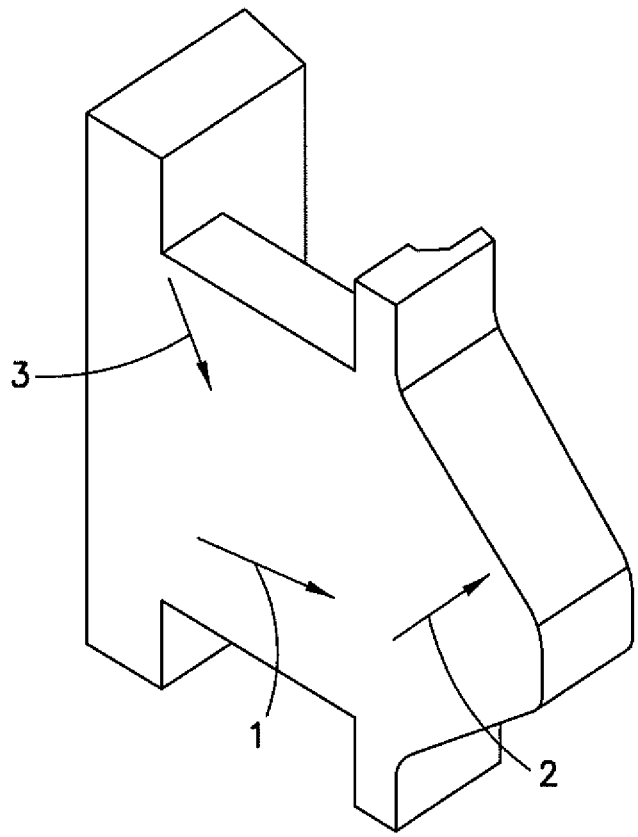
FIGS. 11B and 11C are section views of the teeth shown in FIG. 11A.
Figure 11C:
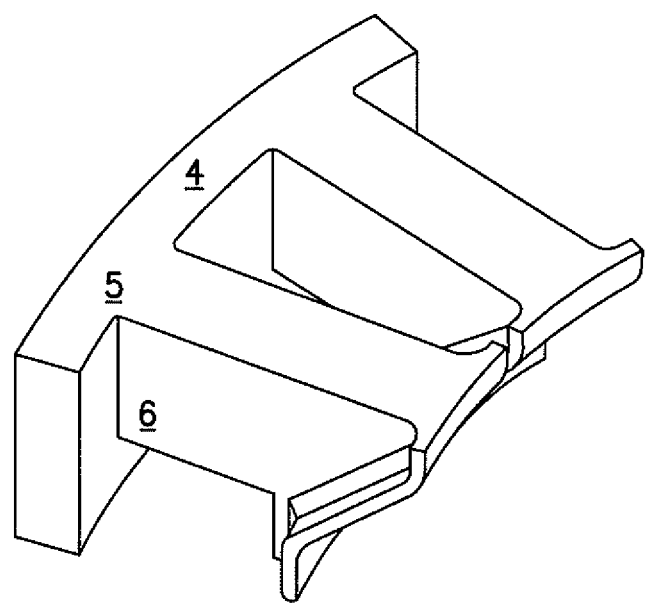

FIG. 11A illustrates a portion of the example stator winding core 220 showing two teeth 224. FIGS. 11B and 11C illustrate cross-sectional views along two orthogonal mid-planes of the teeth 224 of the stator winding core 220.

As illustrated in FIG. 11B, the flow of magnetic flux in the main section of the teeth, denoted as 1, may be bidirectional, radially inward, or radially outward. Similarly, the flux flow in the main section of the yoke, shown as 4 in FIG. 11C, may also be bidirectional, clockwise, or counter-clockwise, concentric to the motor axis. At regions marked 2 and 3 (FIG. 11B), the flux flow may be bidirectional, but angled to a principal axis of the stator (e.g., an axis about which the stator winding core 220 or yoke 222 rotates). Regions marked 1, 2, 3, and 4 may all be on the two mid-planes of the stator tooth. Regions marked 5 and 6 (FIG. 11C) may be away from the mid-planes, and the flux flow in these regions may be omnidirectional, but confined to a plane that is angled to the principal planes of the stator.

For optimal performance, referring still to FIGS. 11B and 11C, regions marked 1, 2, 3, and 4 may utilize the material 10 having high magnetic permeability along the direction (surface) of magnetic flux flow and high electrical resistivity in the direction normal to the direction (surface) of magnetic flux flow. Regions marked 5 and 6, where magnetic flux flow is confined to a plane, may utilize the material having high permeability in the plane of the flux flow and high resistivity in the direction normal to the plane.

Figure 12:
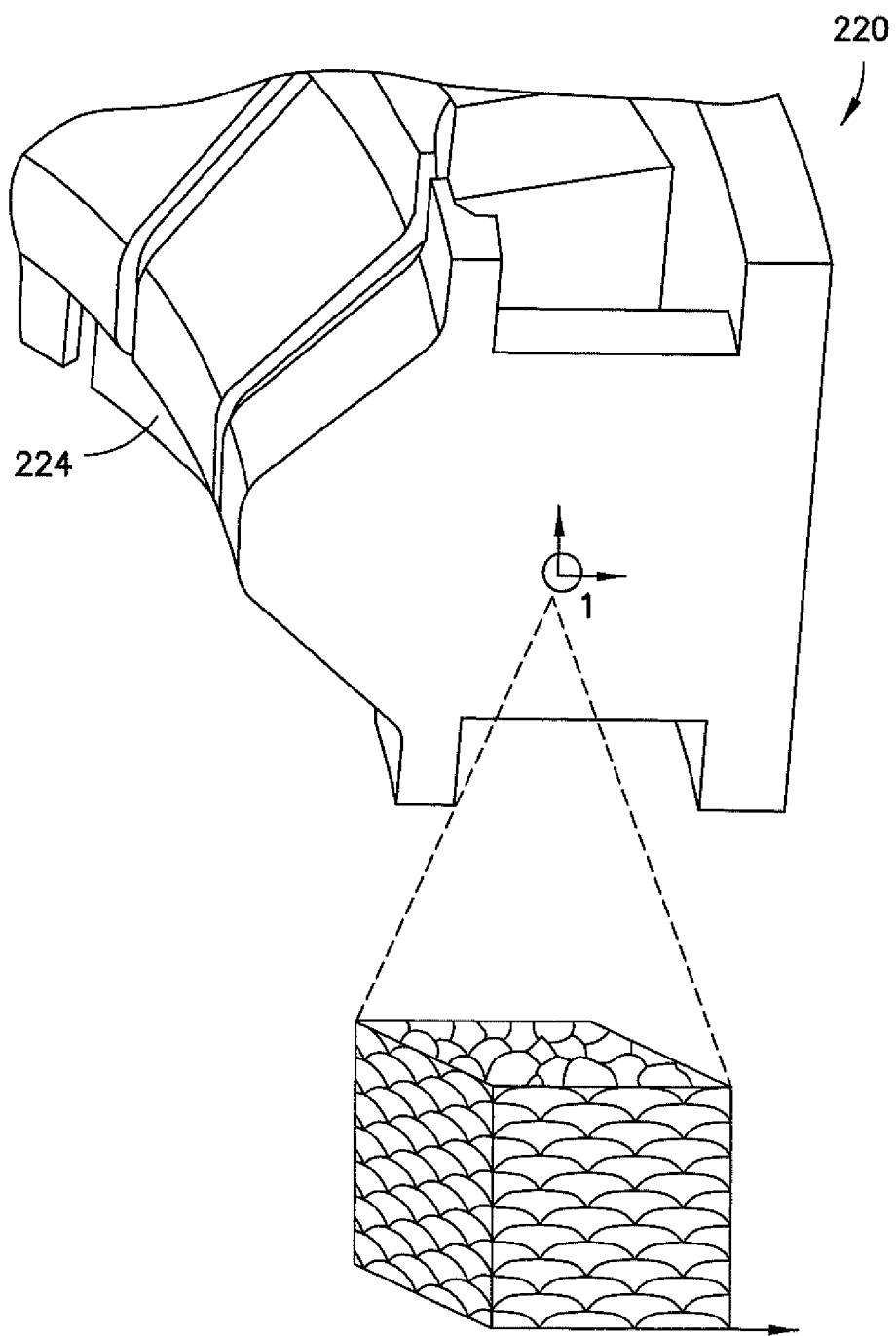
FIGS. 12-14 are schematic representations of directional microstructures in regions of the stator winding core of FIG. 10.
Figure 13:
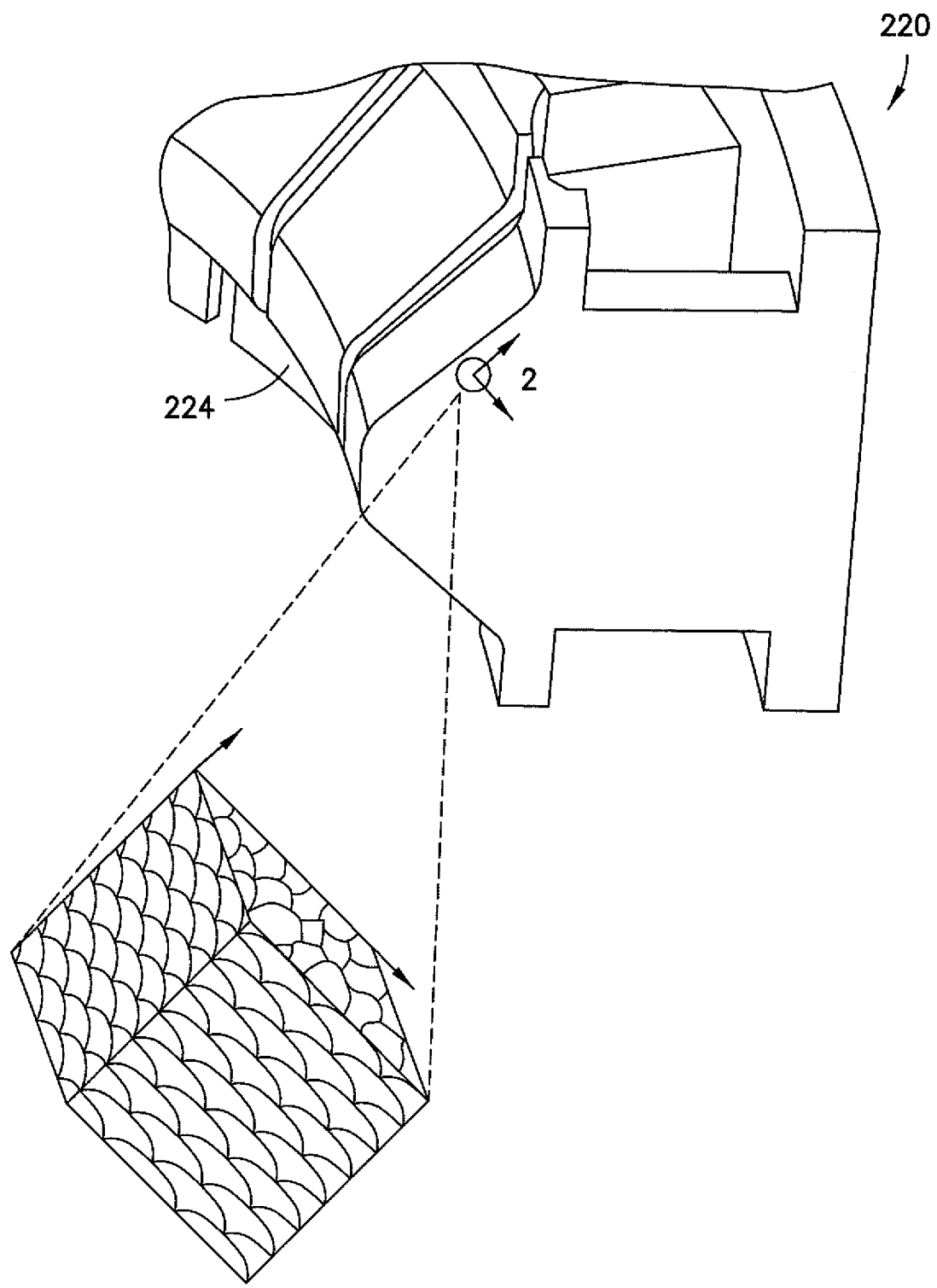
Figure 14:
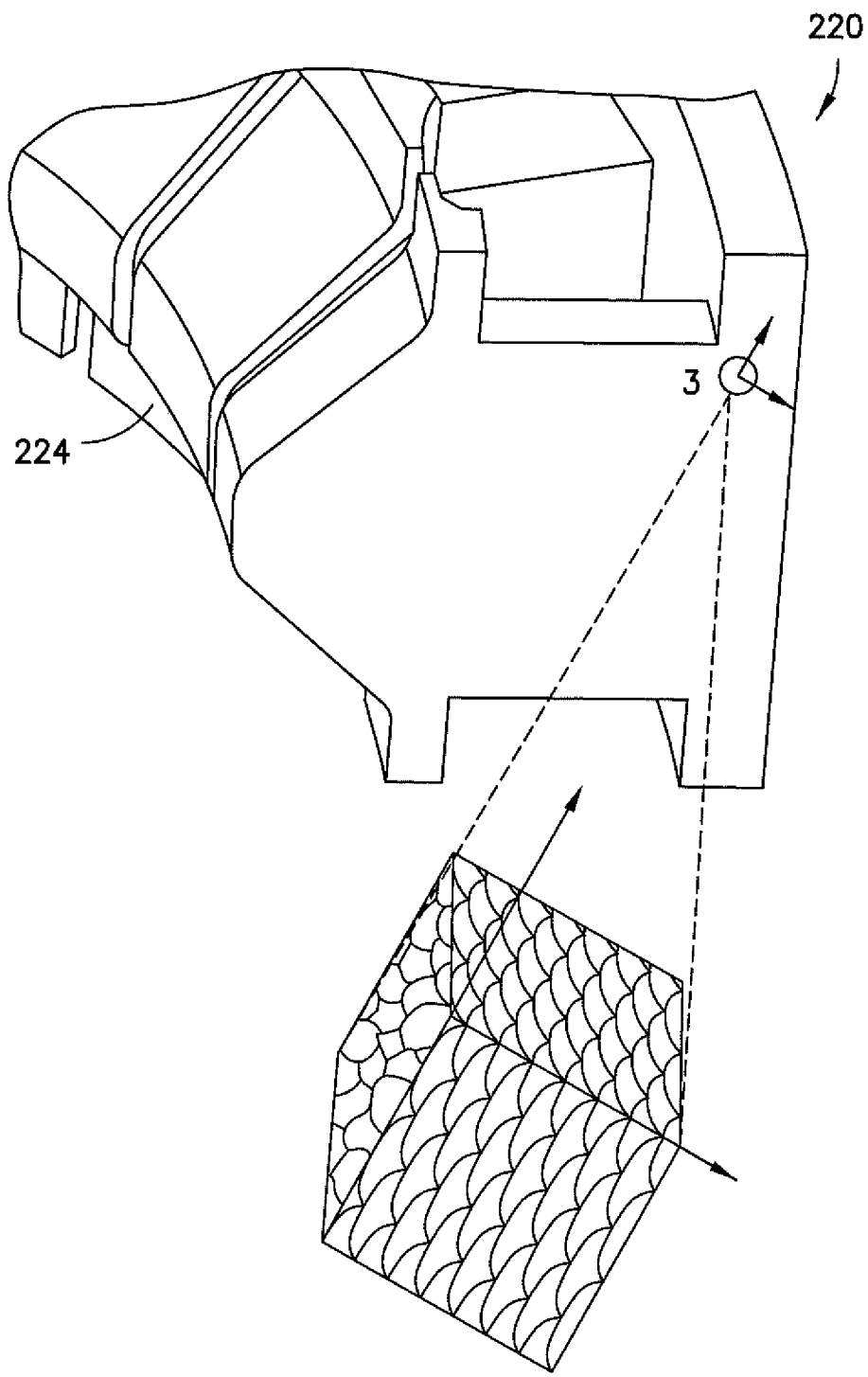
Figure 15:
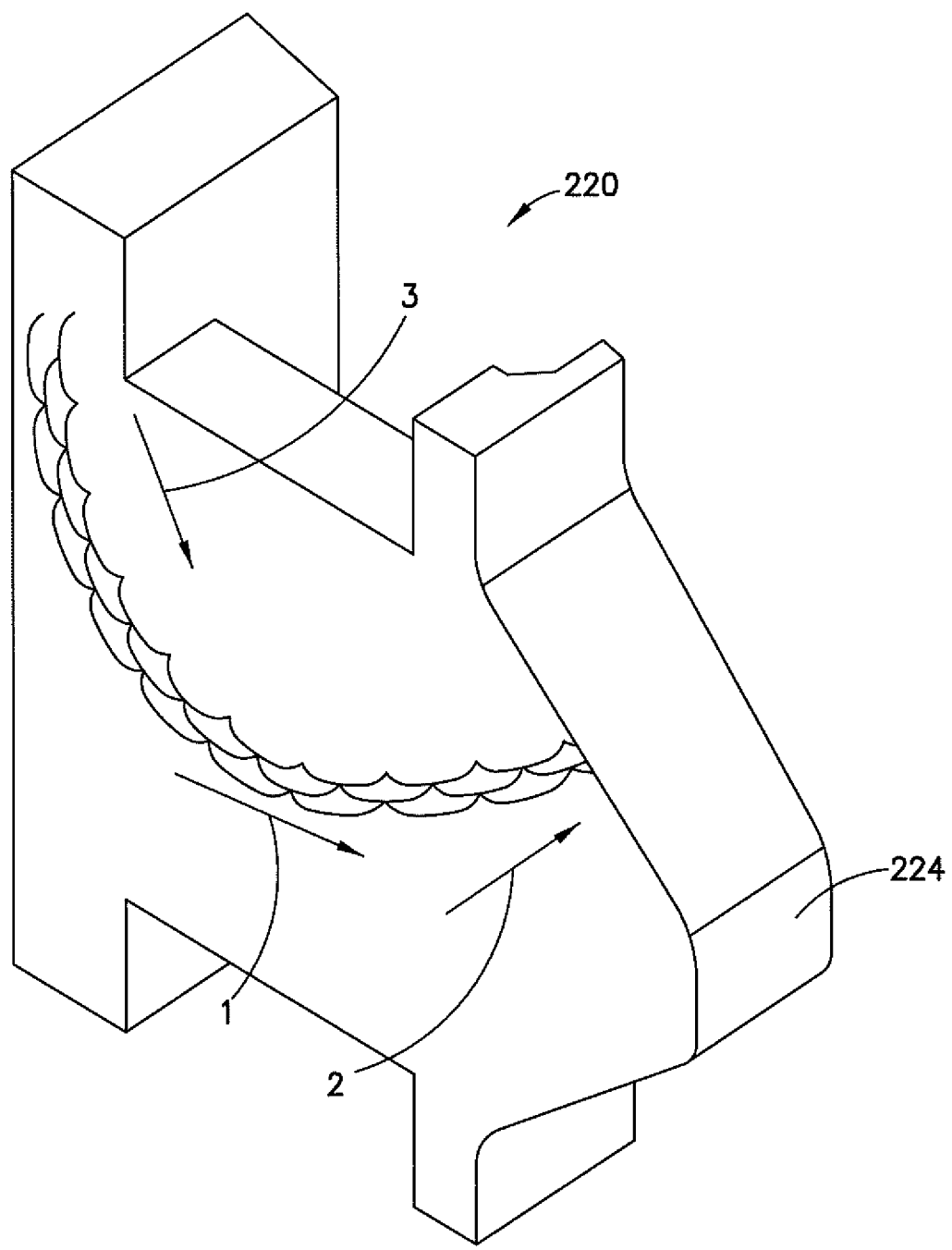
FIG. 15 is a schematic representation of transitions in the microstructure in regions of the stator winding core.

The direction- and location-dependent properties described above with respect to FIGS. 11A-11C may be facilitated by direction- and location-dependent microstructure provided in accordance with the present embodiment. The direction may be varied from one region to the next as illustrated in the examples of FIGS. 12-15. FIGS. 12-14 present examples of the desired directional microstructure in regions 1, 2, and 3 of the stator winding core (FIG. 12 illustrates the directional microstructure in region 1, FIG. 13 illustrates the directional microstructure in region 2, and FIG. 14 illustrates the directional microstructure in region 3). FIG. 15 illustrates how the microstructure may transition through these regions to vary the magnetic flux flow.

The example direction- and location-dependent microstructure of the hybrid field motor described with respect to FIGS. 12 to 15 may be produced by the deposition (spray-forming) techniques explained earlier in the text.

Although FIGS. 6A-15 depict the microstructure of the material consistently with the example microstructure of FIGS. 1 and 2, it should be noted that the example microstructure of FIGS. 4 and 5 may be used.

In accordance with one aspect, a material comprises: at least one layer of a plurality of domains, each domain being flattened in a first direction and elongated in a second direction normal to the first direction. The flattened and elongated domains define an anisotropic microstructure that facilitates a magnetic flux flow in the second direction.

Each domain may comprise a core of electrically conductive material at least partially surrounded by a coating of electrically insulating material to form an insulating boundary on the core. The core of electrically conductive material may comprise an iron alloy, and the coating of electrically insulating material may comprise aluminum oxide. The flattened and elongated domains may exhibit an increased permeability in the second direction relative to a permeability in the first direction. The flattened and elongated domains may exhibit an increased electrical resistivity in the first direction relative to an electrical resistivity in the second direction. The material may further comprise at least two layers, each comprising a plurality of domains, wherein each domain of at least one of the layers comprises electrically conductive material and each domain of at least one of the other layers comprises an electrically insulating material, wherein the at least one of the other layers insulates the at least one of the layers of electrically conductive material. The at least one layer of a plurality of domains may be curved to conduct magnetic flux in a non-linear direction. The material may further comprise at least two layers of pluralities of domains, wherein domains of the second layer are deposited on domains of the first layer so as to overlap with the domains of the first layer.

In accordance with another aspect, a stator core of a radial-field electric motor comprises: a yoke having a ring structure configured to rotate about an axis; and tooth structures extending radially inward from an inner-facing surface of the yoke. The yoke comprises a material defined by layers of a plurality of domains, the domain of each layer being flattened in a first direction and elongated in a second direction normal to the first direction. The flattened and elongated domains define an anisotropic microstructure that facilitates a magnetic flux flow in the second direction in the yoke.

The domains may be deposited to define the anisotropic microstructure as a direction- and location-dependent microstructure. The tooth structures may comprise isotropic microstructures. The anisotropic microstructure in the yoke may be configured to facilitate circumferential magnetic flux flow in the yoke.

In accordance with another aspect, a stator winding core of a hybrid-field electric motor comprises: a yoke having a ring structure; and a plurality of teeth on an inner-facing surface of the yoke. The yoke and the teeth each comprise a material defined by layers of a plurality of domains, the domain of each layer being flattened in a first direction and elongated in a second direction normal to the first direction. The flattened and elongated domains define an anisotropic microstructure that facilitates a magnetic flux flow in the second direction in one or more of the yoke and the teeth.

The magnetic flux flow in the teeth may be bidirectional, radially inward, or radially outward. The magnetic flux flow in the teeth may be angled relative to a principal axis of the yoke. The magnetic flux flow in one or more of the yoke and the teeth may be omnidirectional. A direction of the magnetic flux flow may be varied between different regions of each of the teeth. Each domain may comprise a core of electrically conductive material at least partially surrounded by a coating of electrically insulating material to form an insulating boundary on the core. The core of electrically conductive material may comprise an iron alloy, and the coating of electrically insulating material may comprise aluminum oxide. The flattened and elongated domains may exhibit an increased permeability in the second direction relative to a permeability in the first direction, and the flattened and elongated domains may exhibit an increased electrical resistivity in the first direction relative to an electrical resistivity in the second direction.

In accordance with another aspect, a method comprises: spraying a first plurality of particles in a first direction for deposition on a surface; causing the first plurality of sprayed particles to deposit on the surface and to flatten in the first direction and to elongate in a second direction substantially normal to the first direction, wherein the flattened and elongated particles form domains of a first layer; subsequently spraying a second plurality of particles in the first direction for deposition on at least a portion of the first layer; causing the second plurality of sprayed particles to deposit on at least a portion of the first layer and to flatten in the first direction and to elongate in the second direction, wherein the flattened and elongated particles form domains of a second layer on the first layer. The formed domains of the first layer and the formed domains of the second layer define an anisotropic microstructure that facilitates a magnetic flux flow in the second direction.

Each particle of the first plurality of particles may comprise a core of electrically conductive material at least partially surrounded by a coating of electrically insulating material to form an insulating boundary on the core. The first plurality of particles comprising the core of electrically conductive material may comprise an iron alloy, and the coating of electrically insulating material may comprise aluminum oxide. At least a portion of the second plurality of sprayed particles may not be deposited on the first layer, thereby causing a split in the magnetic flux flow in the second direction.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications, and variances which fall within the scope of the appended claims.

What is claimed is:

1. A material, comprising:
   at least one first layer and at least one second layer, each of the at least one first layer and the at least one second layer comprising a plurality of domains, the domains of the at least one first layer being in contact with each other and the domains of the at least one second layer being in contact with each other, each domain being flattened in a second direction and elongated in a first direction normal to the second direction;
   at least one third layer between the at least one first layer and the at least one second layer, the at least one third layer comprising a plurality of domains, wherein the domains of an upper surface of the at least one third layer are deformed on upper surfaces thereof to engage and correspond to lower surfaces of the domains in the at least one first layer, and wherein the domains of a lower surface of the at least one third layer are deformed on lower surfaces thereof to engage and correspond to upper surfaces of the domains in the at least one second layer;
   wherein the flattened and elongated domains of the at least one first layer and the at least one second layer each define an anisotropic microstructure that facilitates a magnetic flux flow in the first direction; and
   wherein the domains of the at least one third layer define an electrically insulating boundary separating the at least one first layer from the at least one second layer.

2. The material of claim 1, wherein the domains of the at least one first layer and the at least one second layer each comprise a core of electrically conductive material, and wherein the domains of the at least one third layer each comprise a core of electrically conductive material surrounded by a coating of electrically insulating material to form an insulating boundary on the core of the electrically conductive material of the at least one third layer.

3. The material of claim 2, wherein the cores of the at least one first layer and the at least one second layer comprise an iron alloy.

4. The material of claim 3, wherein the cores of the at least one third layer comprise an iron alloy and the coatings of electrically insulating material comprise aluminum oxide.

5. The material of claim 1, wherein the flattened and elongated domains of the at least one first layer and the at least one second layer exhibit an increased permeability in the first direction relative to the second direction.

6. The material of claim 5, wherein the flattened and elongated domains of the at least one first layer and the at least one second layer exhibit an increased electrical resistivity in the second direction relative to an electrical resistivity in the first direction.

7. The material of claim 1, wherein domains of the at least one first layer are deposited on domains of the at least one third layer so as to overlap with the domains of the at least one third layer.

8. The material of claim 1, wherein the at least one first layer and the at least one second layer are curved to conduct flux in a non-linear direction.

9. The material of claim 1, wherein the domains of the at least one third layer overlap underlying domains and are overlapped by overlying domains.

* * * * *